United States Patent
Swett

[15] 3,680,828
[45] Aug. 1, 1972

[54] MOLD FOR CONGEALABLE COMESTIBLES

[72] Inventor: James B. Swett, Barrington, R.I.

[73] Assignee: Dart Industries Inc., Los Angeles, Calif.

[22] Filed: March 5, 1970

[21] Appl. No.: 17,009

Related U.S. Application Data

[63] Continuation of Ser. No. 697,259, Dec. 12, 1967, abandoned, which is a continuation of Ser. No. 443,223, March 29, 1965, abandoned.

[52] U.S. Cl. ..................249/134, 150/.5, 249/104, 249/121, 249/160, 249/204
[51] Int. Cl. ..............................................B28b 7/34
[58] Field of Search..107/19; 150/0.5; 249/104, 117, 249/134, 102, 121, 160, 204; D44/1; 99/440; 220/42 A

[56] References Cited

UNITED STATES PATENTS

| | | | |
|---|---|---|---|
| 85,605 | 1/1869 | Musgrove | 249/117 |
| D206,016 | 10/1966 | Brown | D44/1 |
| 211,859 | 2/1879 | Manley | 99/440 |
| 1,516,582 | 11/1924 | Spalding | 220/42 A X |
| 1,932,298 | 10/1933 | Van Emden | 107/19 |
| 2,235,964 | 3/1941 | Meyer et al. | 249/104 X |
| 2,695,732 | 11/1954 | Tupper | 150/0.5 |
| 2,765,831 | 10/1956 | Tupper | 150/0.5 |
| 2,980,039 | 4/1961 | Jolly | 249/134 |
| 3,128,724 | 4/1964 | Linder | 249/102 |
| 3,429,475 | 2/1969 | Scholtz | 150/0.5 X |

Primary Examiner—Edward L. Roberts
Attorney—Paul R. Wylie, Robert P. Whipple and Harold R. Beck

[57] ABSTRACT

A reusable mold for food stuffs and the like of the type that are introduced in the mold as a moldable material and formed therein to a molded shape retaining solid tightly conforming to the contours of the mold, said mold being fabricated from plastic materials and being provided with a means of facilitating removal of the solidified products forming part of the mold enclosure.

8 Claims, 7 Drawing Figures

INVENTOR
JAMES B. SWETT
BY Robert J Doherty
ATTORNEY

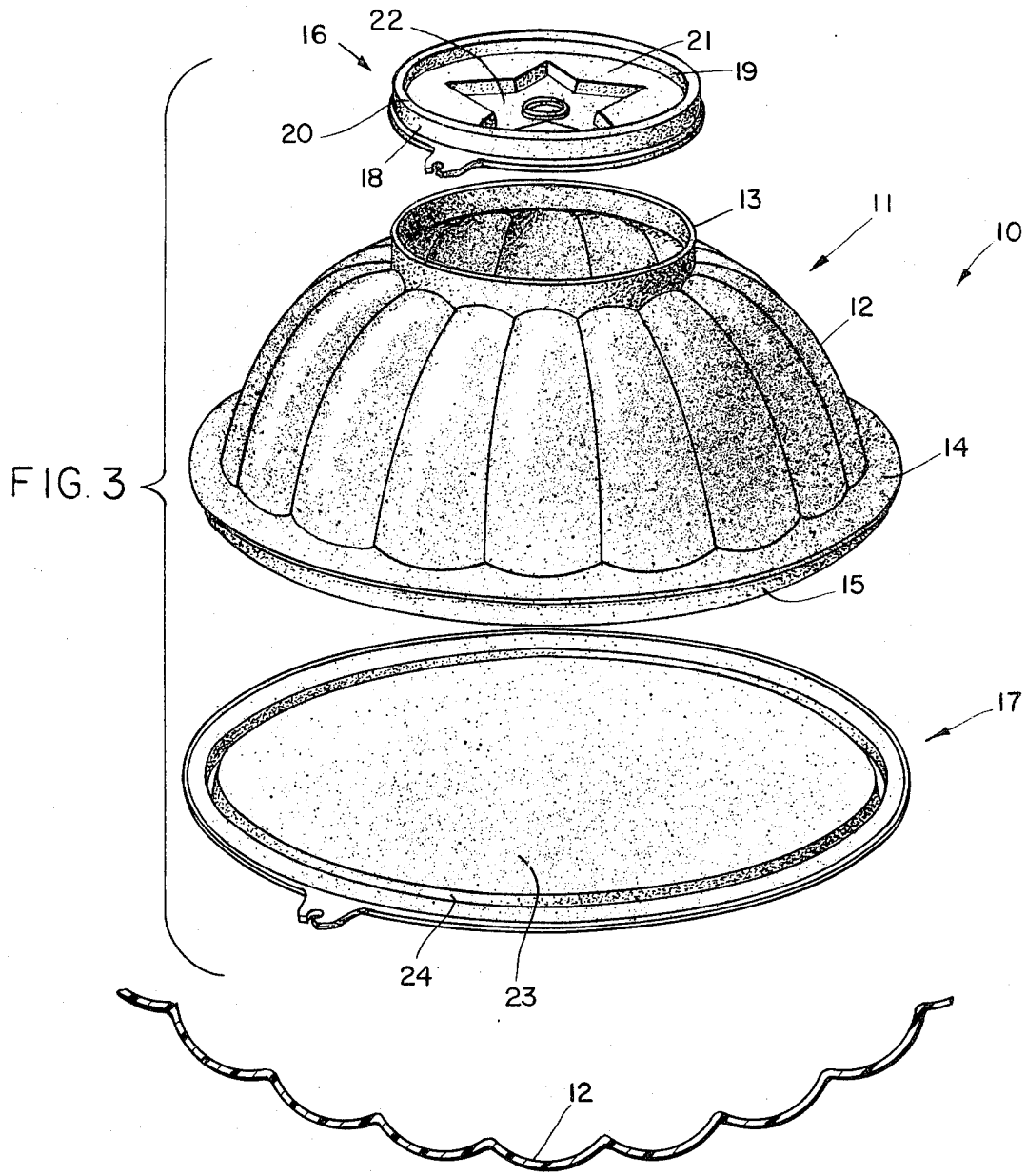

INVENTOR
JAMES B. SWETT
BY Robert J Doherty
ATTORNEY 3,680,828

MOLD FOR CONGEALABLE COMESTIBLES

This application is a continuation of application Ser. No. 697,259, filed Dec. 12, 1967, and now abandoned, which is a continuation of application Ser. No. 443,223, filed Mar. 29, 1965, and now abandoned.

This invention relates to a mold for producing decorative effects in foodstuff materials and the like and more particularly to a kit or the like in which a variety of configurations of moldable foodstuffs may be produced. Foodstuffs material of a congealable nature such as gelatin are particularly adapted for use with the mold and kit of the present invention in a manner so as to produce a variety of configured salad and dessert dishes which are appropriately tailored for particular seasonal events, such as floral patterns, e.g. tulips, to signify spring, and a turkey configuration to symbolize fall and Thanksgiving time.

In molding such products which broadly include nonfoods as well as foodstuffs, it is desirable to conveniently provide means by which such various configurations could be imparted thereto without the necessity of providing a separate mold for each such desired configuration. Furthermore, in the preparation and serving of such foodstuffs, it is highly desirable that provision be afforded by which the foodstuff may be molded, displayed and served in an aesthetically pleasing manner. It is also desirable that such operations be carried out with the least effort upon the part of the housewife wherein a minimum number of containers are utilized and where the molded foodstuff is accordingly subjected to a reduced amount of handling so as to preserve its originally molded shape intact as well as reducing the amount of utensils to be cleaned.

It is, therefore, the primary object of this invention to provide means by which the aforegoing desirable features may be accomplished in an uncomplicated simple manner.

Another object is to provide a means by which foodstuffs may be molded so as to present a variety of overall physical configurations by selective substitution of minor portions of a combination mold and storage member.

Still another object is the provision of means by which a foodstuff may be molded into a particular configuration, which foodstuff material may be conveniently removed from its mold and displayed and served on a member utilized for the removal thereof.

Other objects of the present invention will become apparent in the course of the following specification.

The aforementioned objects of the present invention are achieved by the provision of a combination mold and storage member and a combination serving and removing member where the mold member is provided at one end thereof with means by which a variety of end closures exhibiting various configurations may be alternately used in conjunction therewith and wherein the serving member is configured so as to assist in the procedure by which the foodstuff is removed from its mold and placed in display and serving positions.

The invention will appear more clearly from the following detailed description when taken in conjunction with the accompanying drawings, showing, by way of example, a preferred embodiment of the inventive concept.

In the drawings:

FIG. 3 is an exploded perspective view showing the component parts of the combination mold and storage member;

FIG. 4 is a partial cross-sectional view of the central mold portion shown in FIG. 3 and sets forth the scalloped configuration thereof;

Throughout the specification, like reference numerals are used to indicate like parts.

Figure 6:
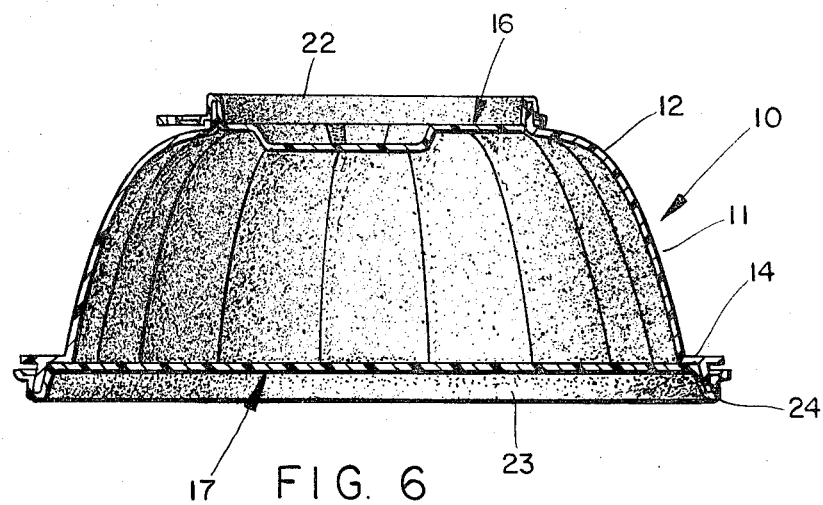
FIG. 6 is a cross-sectional view in assembled condition of the combination mold and storage member shown in FIG. 3 of the drawings; and, FIG. 7 is a partial cross-sectional view of the combination mold and storage member and shows a modification thereof with respect to the configuration of the design imparting portion.

Referring now to the drawings and particularly FIGS. 3 and 6 thereof, the combination mold and storage member 10 is clearly depicted therein. Such member 10 is comprised of a central mold portion 11 having upwardly and inwardly directed side walls 12 which terminate at the upper end thereof in a peripheral circular flange 13 and at the lower end thereof in a shoulder portion 14. This shoulder portion 14 is generally normal to the side walls 12 as best shown in FIG. 6 of the drawings and has dependent therefrom at the lower side thereof a downward extending peripheral flange 15. The cross-sectional configuration of the central mold portion 11 is best shown by reference to FIG. 4 of the drawings.

Figure 1:
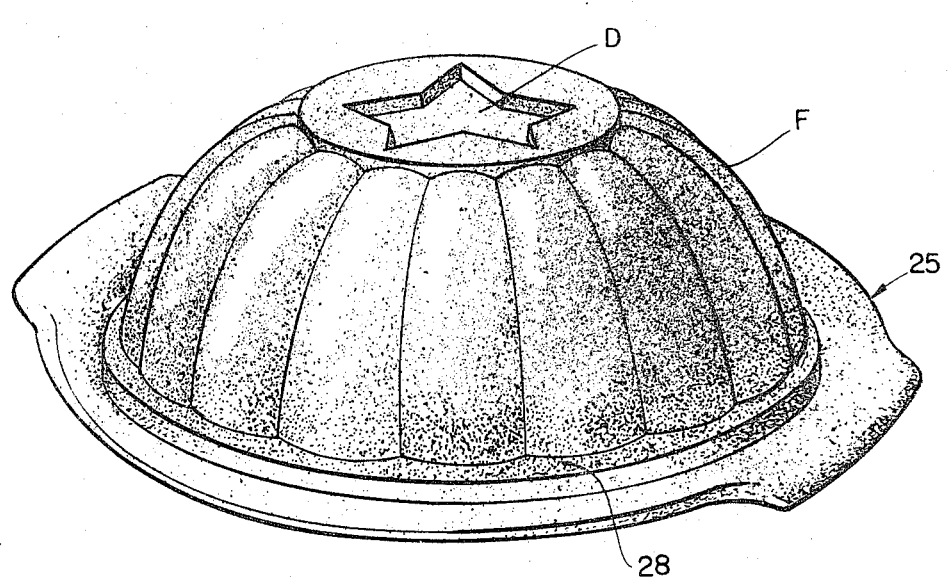
FIG. 1 is a perspective view of the removing and serving tray having a molded foodstuff thereupon wherein a star-shaped depression forms the major part of the upper surface of such foodstuff.
Figure 2:
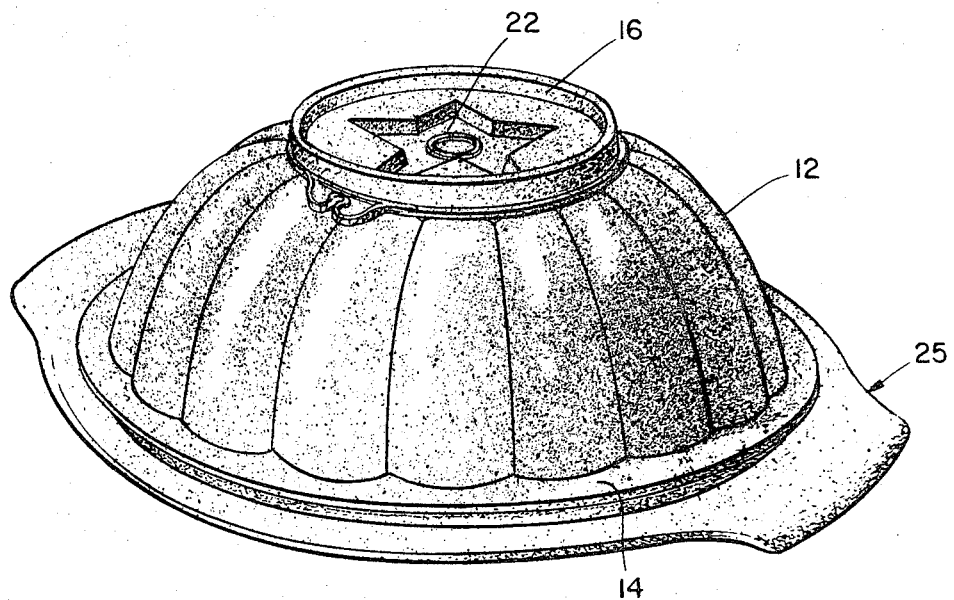
FIG. 2 is a perspective view of the tray and foodstuff material shown in FIG. 1 of the drawings, previous to the time at which the main portion of the mold member is removed therefrom and shows in particular the partial nestable relationship between the tray and the mold.

As is readily apparent the central mold portion 11 is open at either end and provision is made by means of smaller end closure 16 and larger end closure 17 to close either end thereof so as to present an air-tight container member when both such end closures are in place such as shown in FIG. 6 of the drawings. The smaller end closure 16 is provided with a U-shaped peripheral portion consisting of an upper wall 18, an inner wall 19 and a connecting wall 20. The central portion of the smaller end closure 16 is provided with an imperforate wall 21 having a design 22 generally centrally depressed therein such as the star-shaped configuration shown in FIGS. 2 and 3 of the drawings. It is to be understood that various other smaller end closures may be provided, which other end closures may have other design configurations generally centrally depressed within the central wall portions 21 thereof and in this manner various configurations may be imparted to the material molded within the mold member 10 and thus various seasonal and holiday decors may be imparted thereto.

The larger end closure 17 is similarly shaped to the smaller end closure 16 in that such comprises a generally depressed central portion 23 having a peripheral U-shaped rim 24. Both end closures 16 and 17 may be formed of a resilient material such as low-density polyethylene so that by the respective sealing engagement with the peripheral flanges 13 and 15, a mold container storage member which is essentially sealed against the ingress and egress of moisture is provided. In this manner, then, foodstuff materials molded within the mold member 10 may be suitably stored in a refrigerator or the like means and be protected from the undesirable absorption of moisture, odors or the like.

Figure 5:
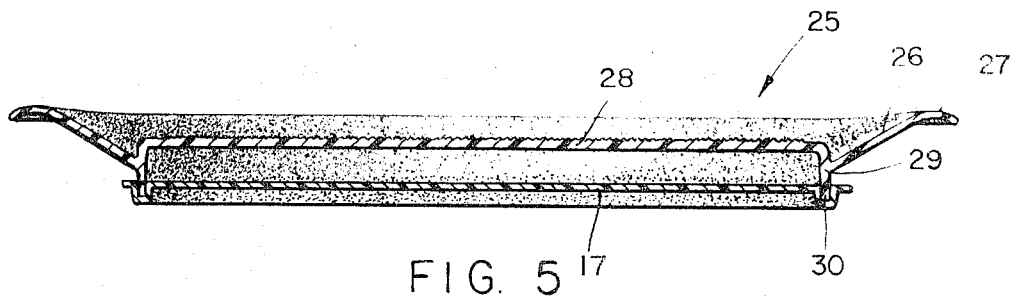
FIG. 5 is a cross-sectional view of the combination serving and removing tray and in particular shows the means by which the lower portion of the mold member shown in FIG. 3 is preferably attached to such tray member when not being utilized in conjunction with the mold member so as to provide an improved base therefor.

Turning now to FIG. 5 of the drawings, the combination serving and removing member 25 is best depicted therein in cross-sectional elevation. Such is comprised of a tray-like portion 26 having handles 27 dependent therefrom, an upstanding centrally located platform 28 and a lower peripheral flange 29. The upper surface of the central platform 28 is provided with a pebbled or roughened surface so that foodstuff materials placed thereon will be held in more secure relationship therewith. The peripheral flange 29 is at spaced intervals further provided with leg portions 30. The flange 29 and particularly the leg portions 30 thereof are dimensioned so as to be of a peripheral extent equal to or slightly greater than that presented by the groove 24 of the larger end closure 17 and in this manner serve as a mounting upon which such end closure 17 may be fitted when not engaged with the lower peripheral flange 15 of the central mold member 11. By so doing, not only is a convenient place provided for the storage of such end closure 17 when not in use, but further, since such end closure 17 as was heretobefore brought out is formed of a resilient and flexible material such as low-density polyethylene, its fitment to the base portion of the tray 25 so that the surface of connecting wall 20 in turn contacts the supporting surface allows such tray to be utilized on easily marred surfaces. It should be brought out at this time that both the central mold portion 11 and the tray 25 are conveniently formed of relatively stiff and inflexible shape retaining materials and thus the increased likelihood that the portions of the tray 25 in contact with supporting surfaces would tend to mar such if it were not for the provisions above set forth in conjunction with the larger end closure 17.

The central platform 28 is peripherally dimensioned slightly smaller than that of the downwardly extending peripheral flange 15. Also, the extent to which such platform 28 rises above its proximate tray portions 26 is dimensioned so as to be equal to or slightly smaller than the downward extent of such peripheral flange 15 and in this manner the platform 28 may be placed within the peripheral opening of the flange 15 so as to permit the foodstuff material molded within the member 10 to rest thereupon and in this manner facilitate the removal therefrom.

The operation of the device with reference to FIGS. 1—6 of the drawings is as follows: The smaller end closure 16 having the desired configuration to correspond with the seasonal event is engaged at the smaller upstanding periphery 13 of the central mold portion 11 and the thus completed entity inverted so that such is resting upon the connecting wall 20 of the smaller end closure 16. In this manner then, an open-ended container is presented for receipt of a foodstuff material F. Such foodstuff material may be of the congealable type such as gelatin and will thus conform to the configuration of the above described composite open-ended container or may be of a salad type wherein packing or compression thereof is necessary to fill out the surface irregularities presented by such composite container. The larger end closure 17 is then engaged with the peripheral flange 15 so as to form an air and moisture tight enclosure by which the molded material F may be stored until that time at which its use is desired. At such time, the combination mold and storage member 10 is withdrawn from, for example, a refrigerator, and the larger end closure removed therefrom and engaged with the flange 29 and legs 30 of the combination serving and removing member 25 in a manner hereinbefore described. Alternatively, member 25 may be utilized as a temporary larger end closure in place of the closure 17. Member 25 is then inverted and placed so that its central upstanding platform 28 is received within the peripheral extent of flange 15 and rests upon shoulder 14 and is in contact with or in close proximity to the base of foodstuff material F depending on the height to which such foodstuff F was placed in relationship to the side walls 12 during the molding step. The entire assemblage including the combination mold and storage member 10 and the combination serving and removing member 25 is inverted so as to rest upon the connecting wall of the groove 24 of the larger end closure 17. The central portion 11 of the mold 10 along with smaller end closure 16 having suitable configuration 22 thereon is then removed leaving the foodstuff F having impressed design D imparted thereto and supported by the upper pebbled surface of the tray's central platform.

Figure 7:
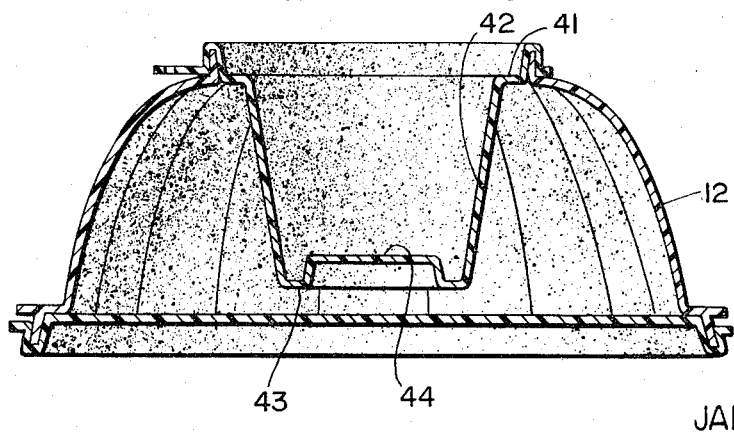

It should also be pointed out that the smaller end closures 16 may be of several preferred over-all constructional embodiments. Thus, when the mold member 10 is primarily but not limited to use with non-pourable or compressible foodstuffs such as potato salad the construction of the smaller closures 16 may be of a configuration exhibiting a major central depression such as shown in FIG. 7 of the drawings. Thus, as illustrated in FIG. 7 the imperforate central wall 41 is provided with a downwardly extending wall portion 42 which connects with a secondary wall 43 which contains design 44 inwardly thereof. In this manner, the design 44 is brought into closer relationship with the upper fill line of the mold member 10 as represented by flange 15 when member 10 is in its inverted position for receipt of foodstuff F. Thus over-all packing pressure exerted upon the upper surface of such foodstuff will serve to conform the foodstuff in closer relationship with the configurations of the design. Design 44 in such embodiment may be of a convex attitude in distinction from the design 22 so that a material of varying appearance (color, texture, etc.) may be placed thereon prior to the insertion of the main body of food-stuff F.

Depending upon the material utilized, various means such as the application of hot water to the outer surfaces of the central mold portion 11 and the small end closure 16 may be applied at a convenient stage or stages of the removal procedure above outlined and smaller end closure 16 may be separately removed therefrom.

As shown in FIG. 3, small end closure 16 is outwardly removable to permit air pressure to aid in the removal of the foodstuffs. As previously described, closure 16 of flexible material forms part of the mold enclosure and therefore provides a means for facilitating the removal of the shape retaining solid without removal thereof.

I claim:

1. A reusable mold and storage member for forming and storing moldable foodstuffs and the like therein, comprising:

A central relatively rigid plastic mold portion having upwardly and inwardly directed side walls, said central mold portion having a smaller opening at one end thereof and a larger opening at the other end thereof, the peripheral edge of the central mold portion at the smaller opening terminating in an upstanding peripheral flange, the peripheral edge of the central mold portion at the larger opening terminating in a downwardly extending peripheral flange; and resilient plastic end closures engageable with said smaller and larger openings to seal said end portions against liquid ingress and egress, said end closures having U-shaped peripheral grooves adapted for receipt in tight sealing relationship of said flanges.

2. A reusable mold and storage member for forming and storing moldable foodstuffs and the like therein, comprising:

a central relatively rigid plastic mold portion having upwardly and inwardly directed side walls, said central mold portion having a smaller opening at one end thereof and a larger opening at the other end thereof, the peripheral edge of the central mold portion at the smaller opening terminating in an upstanding peripheral flange, the peripheral edge of the larger opening terminating in a generally horizontally disposed finger engageable shoulder portion, said shoulder portion having a downwardly extending flange dependent therefrom; and resilient plastic end closures engageable with said smaller and larger openings to seal said end portions against liquid ingress and egress, said end closures having U-shaped peripheral grooves adapted for receipt in tight sealing relationship of said flanges.

3. A reusable mold for foodstuffs and the like of the type that are introduced in the mold as a moldable material and formed therein to a molded shape retaining solid tightly conforming to the contours of the mold, said mold being fabricated from plastic materials and comprising:

a central mold portion of circular cross-section having upwardly and inwardly directed side walls of scalloped configuration contoured from a larger opening to a smaller opening terminating in a circular upstanding outwardly flared peripheral flange, said larger opening terminating in a shoulder portion extending radially outwardly from said walls, said shoulder portion having an outwardly flared downwardly extending peripheral flange, said central mold portion being fabricated from stiff plastic materials; and, an imperforate closure for said smaller opening adapted to fasten completely around the peripheral flange thereof, said closure having a central wall with a design generally centrally depressed therein and a generally downturned U-shaped peripheral portion having inner and outer walls connected by an upper wall, said outer wall having a normal inside diameter slightly less than the outside diameter of the outwardly flared peripheral flange, said closure being fabricated from resilient plastic materials whereby a moisture tight seal between said closure and central mold will be formed, said closure being outwardly removable from the smaller opening of said central mold portion when the latter is positioned with the larger opening downward.

4. A reusable mold for foodstuffs and the like according to Claim 3 and further comprising a generally tray-shaped member having an upstanding central platform adapted to interfit into said larger end opening in receiving and positioning relationship whereby the solidified product will be positioned on the central platform when the product is released from the mold.

5. A reusable mold for foodstuffs and the like of the type that are introduced in the mold as a moldable material and formed therein to a molded shape-retaining solid tightly conforming to the contours of the mold, said mold being fabricated from plastic material and comprising:

a reusable central mold portion arcuately contoured from a larger opening at one end thereof to a smaller base portion at the other end thereof, said larger opening being provided for the removal of the shape-retaining product from the mold, said arcuately contoured walls being of scalloped formation and terminating in a peripheral circular edge portion forming part of said smaller base portion, said smaller base portion including means for facilitating the removal of said shape-retaining solid and having an area adapted to maintain said mold in stable resting position when placed on a tabular supporting surface to permit the mold to be filled through the larger opening with a foodstuff of the type that can be formed in the mold to a molded shape-retaining solid tightly conforming to the contours thereof when the mold is placed on such support and maintaining such stable resting position when the foodstuff is stored in the mold; and, a substantially flat reusable plastic closure for said larger opening engageable therewith in moisture sealing relationship.

6. A reusable mold for foodstuffs and the like of the type that are introduced in the mold as a moldable material and formed therein to a molded shape-retaining solid tightly conforming to the contours of the mold, said mold being fabricated from plastic materials and comprising:

a central relatively rigid mold portion having upwardly and inwardly directed imperforate sidewalls contoured from a larger opening at one end thereof to a smaller opening at the other end thereof, said smaller opening terminating in an upstanding peripheral flange adapted to receive a closure in moisture sealing relationship; and, a closure for said smaller opening adapted to fasten completely around the peripheral edge portion to form a moisture tight seal therewith, said closure being formed of a resilient plastic material and having a U-shaped peripheral groove adapted for receipt in tight sealing relationship of said upstanding peripheral flange, said closure being outwardly removable from the smaller opening of said central mold portion when the latter is positioned with the larger opening downward.

7. A reusable mold for foodstuffs and the like of the type that are introduced in the mold as a moldable material and formed therein to a molded shape-retaining solid tightly conforming to the contours of the mold, said mold being fabricated from plastic materials and comprising:

a central mold portion contoured from a larger opening at one end thereof to a smaller opening at the other end thereof, said smaller opening terminating in an upstanding peripheral flange adapted to receive a closure in moisture sealing relationship;

a closure for said smaller opening adapted to fasten completely around the peripheral flange thereof to form a moisture tight seal therewith, said closure being formed of a resilient plastic material and having a U-shaped peripheral groove adapted for receipt of said flange and conformable therewith in moisture sealing relationship, said closure being outwardly removable from the smaller opening of said central mold portion when the latter is positioned with the larger opening downward; and a serving and removing member comprising a generally tray-shaped member having an upstanding central platform adapted to interfit into said large end opening in receiving and positioning relationship whereby the solidified product will be centered on said tray-shaped member when the product is removed from the mold.

8. A reusable mold for foodstuffs and the like of the type that are introduced in the mold as a moldable material and formed therein to a molded shape-retaining solid tightly conforming to the contours of the mold, said mold being fabricated from plastic material and comprising:

a reusable central mold portion arcuately contoured from a larger opening at one end thereof to a smaller base portion at the other end thereof, said larger opening being provided for the removal of the shape-retaining product from the mold, said arcuately contoured walls being of scalloped formation and terminating in a peripheral circular edge portion forming part of said smaller base portion, said smaller base portion including means forming part of the mold enclosure for facilitating the removal of said shape-retaining solid and having an area adapted to maintain said mold in stable resting position when placed on a tabular supporting surface to permit the mold to be filled through the larger opening with a foodstuff of the type that can be formed in the mold to a molded shape-retaining solid tightly conforming to the contours thereof when the mold is placed on such support and maintaining such stable resting position when the foodstuff is stored in the mold; and, a substantially flat reusable plastic closure for said larger opening engageable therewith in moisture sealing relationship.

* * * * *